United States Patent
Krupp et al.

(10) Patent No.: US 7,708,798 B2
(45) Date of Patent: May 4, 2010

(54) INFLATOR COMBUSTION CONTROL MECHANISM

(75) Inventors: Robert M. Krupp, Rochester, MI (US); Donald B. Patterson, Rochester, MI (US)

(73) Assignee: TK Holdings, Inc., Armada, MI (US)

( * ) Notice: Subject to any disclaimer, the term of this patent is extended or adjusted under 35 U.S.C. 154(b) by 421 days.

(21) Appl. No.: 11/716,949

(22) Filed: Mar. 12, 2007

(65) Prior Publication Data

US 2007/0210567 A1 Sep. 13, 2007

Related U.S. Application Data

(60) Provisional application No. 60/781,216, filed on Mar. 10, 2006.

(51) Int. Cl.
*B01D 39/12* (2006.01)
*B60R 21/26* (2006.01)

(52) U.S. Cl. .................. 55/525; 280/736; 280/740; 280/742

(58) Field of Classification Search .............. 55/525, 55/526; 280/736, 740, 741, 742; 422/167
See application file for complete search history.

(56) References Cited

U.S. PATENT DOCUMENTS

| | | | | |
|---|---|---|---|---|
| 5,248,162 A * | 9/1993 | Levosinski et al. | .......... | 280/740 |
| 5,609,360 A * | 3/1997 | Faigle et al. | ............... | 280/740 |
| 5,665,131 A * | 9/1997 | Hock et al. | .................. | 55/487 |
| 5,681,056 A * | 10/1997 | Levosinski | ................ | 280/742 |
| 5,816,612 A * | 10/1998 | Faigle et al. | ............... | 280/740 |
| 5,855,635 A * | 1/1999 | Rice | ......................... | 55/486 |
| 6,234,521 B1 * | 5/2001 | Katsuda et al. | ............ | 280/736 |
| 6,406,060 B1 * | 6/2002 | Katsuda et al. | ............ | 280/736 |
| 6,409,214 B2 * | 6/2002 | Katsuda et al. | ............ | 280/741 |
| 6,695,345 B2 * | 2/2004 | Katsuda et al. | ............ | 280/736 |
| 6,840,977 B1 * | 1/2005 | Fukunaga et al. | ........... | 55/526 |
| 6,846,013 B2 * | 1/2005 | Smith | ....................... | 280/740 |
| 6,979,022 B2 * | 12/2005 | Smith et al. | ................ | 280/741 |
| 7,178,829 B2 * | 2/2007 | Blackburn | .................. | 280/736 |

* cited by examiner

*Primary Examiner*—Michael A Marcheschi
*Assistant Examiner*—Robert A Clemente
(74) *Attorney, Agent, or Firm*—L. C. Begin & Associate PLLC.

(57) ABSTRACT

A filter is provided defining an enclosure having a volume that is resiliently variable responsive to an internal pressure within the enclosure. A gas generating system, an airbag system, and a vehicle occupant protection system incorporating the filter are also disclosed.

18 Claims, 3 Drawing Sheets

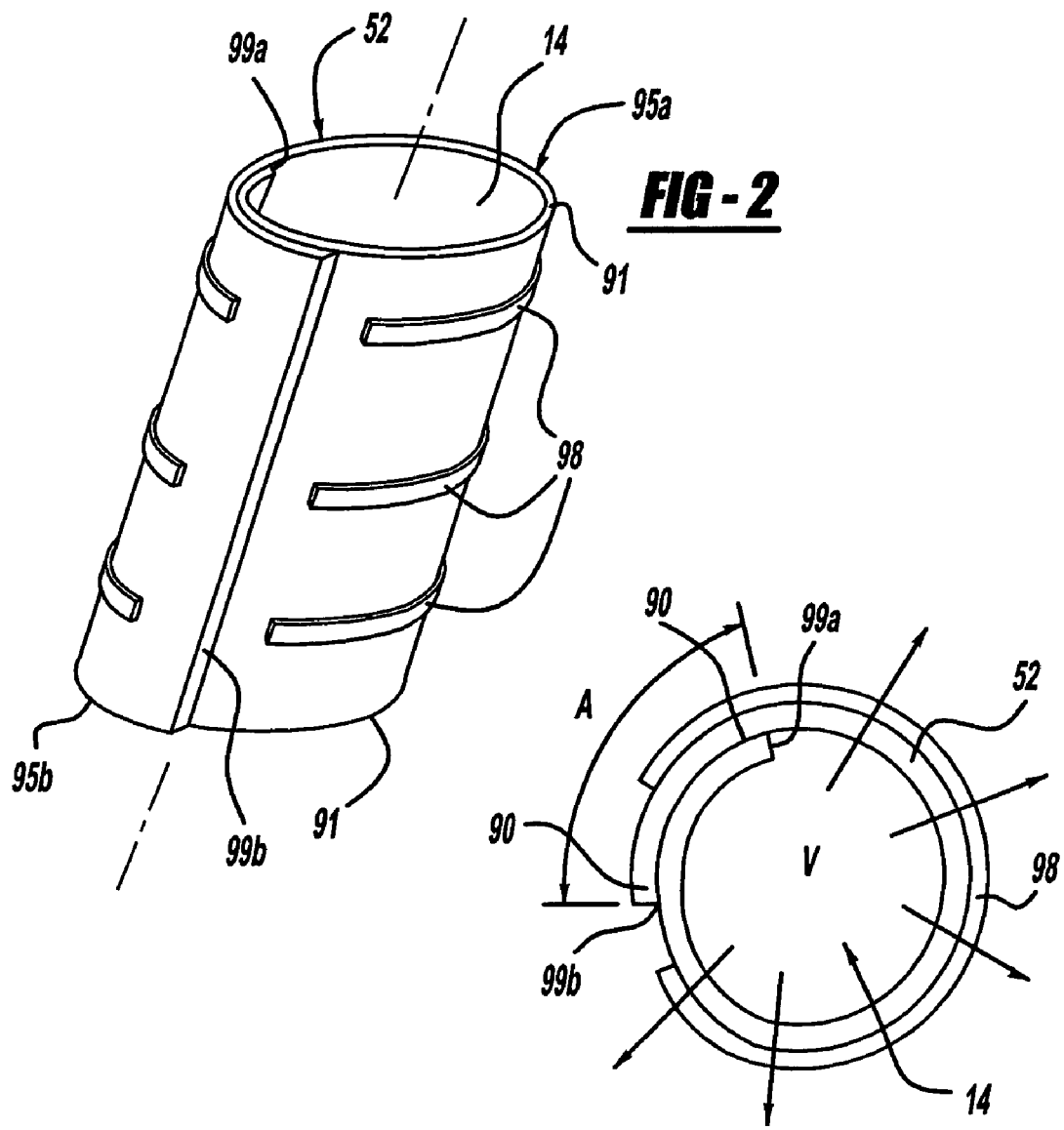
FIG-2
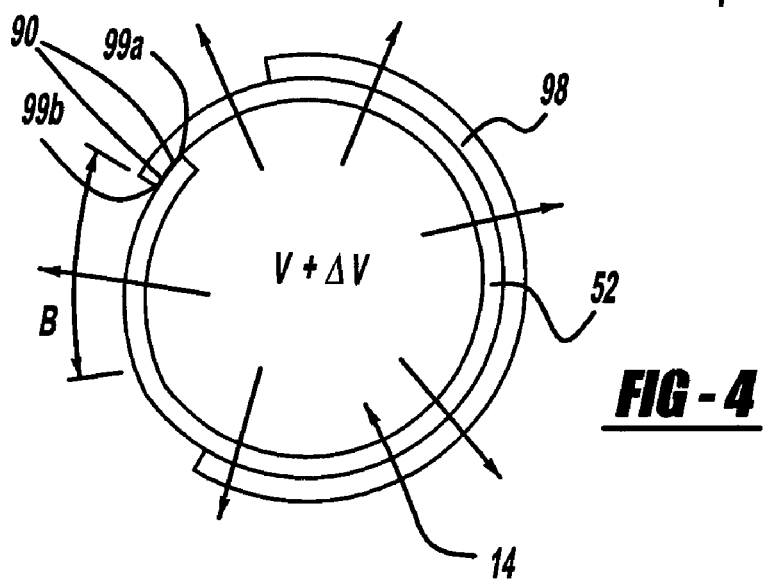
FIG-3
FIG-4

INFLATOR COMBUSTION CONTROL MECHANISM

CROSS REFERENCE TO RELATED APPLICATIONS

This application claims the benefit of provisional application Ser. No. 60/781,216, filed on Mar. 10, 2006.

BACKGROUND OF THE INVENTION

The present invention relates to gas generating systems and, more particularly, to an gas generating system for inflating an inflatable element of a vehicle occupant protection system, the gas generating system incorporating a mechanism for maintaining an average combustion pressure within a predetermined range.

Many solid propellants have an optimum pressure range for combustion. It can be difficult to maintain the gas generating system internal pressure within the optimum pressure range during the majority of the combustion reaction. In addition, low-pressure combustion of the propellant outside of the optimum pressure range may increase the generation of undesirable effluents. Furthermore, operating outside of the optimum combustion range may adversely affect the combustion, thereby abbreviating or shortening the burn of the propellant, or inhibiting sustained combustion of the propellant. It is therefore desirable to maintain the gas generating system internal pressure within the optimum range for combustion of the propellant for as much of the combustion reaction as possible.

BRIEF DESCRIPTION OF THE DRAWINGS

In the drawings illustrating embodiments of the present invention:

FIG. 2 is a perspective view of the filter of FIG. 1;

FIG. 3 is a cross-sectional side view of the filter of FIG. 2 prior to gas generating system activation;

FIG. 4 is a cross-sectional side view of the filter of FIG. 2 after gas generating system activation.

SUMMARY OF THE INVENTION

A filter is provided defining an enclosure having a volume that is resiliently variable responsive to an internal pressure within the enclosure. A gas generating system, an airbag system, and a vehicle occupant protection system incorporating the filter are also disclosed.

DETAILED DESCRIPTION

Figure 1:
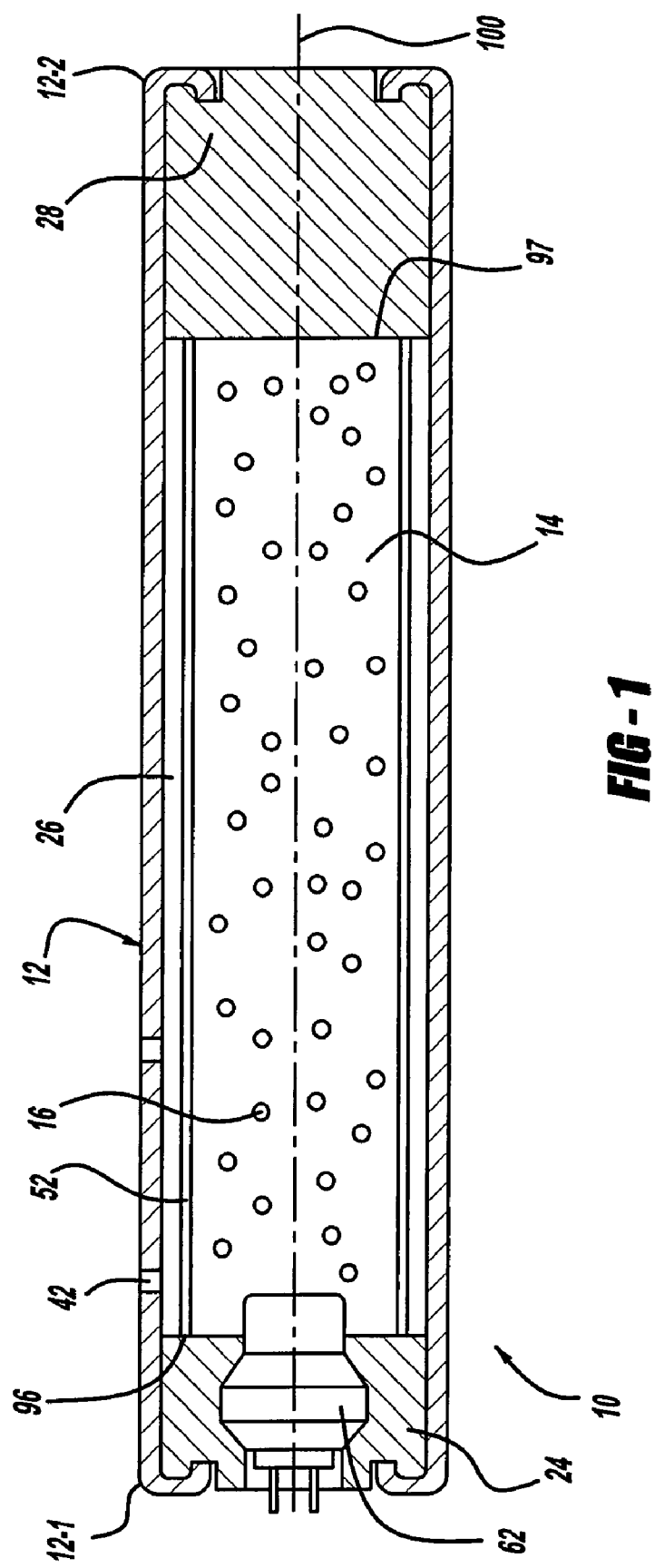
FIG. 1 is a cross-sectional side view of a gas generating system in accordance with the present invention showing an expandable filter of the gas generating system prior to system activation.

FIG. 1 shows a cross-sectional view of one embodiment of an inflator of gas generating system 10 in accordance with the present invention. Gas generating system 10 is contemplated for use primarily in passenger-side inflatable restraint systems in motor vehicles, such as are known in the art; however, it is not limited thereto. The components of gas generating system 10 may be manufactured from known materials and by known processes.

Gas generating system 10 includes an elongate, generally cylindrical body 12 defining an enclosure and having a first end 12-1, a second end 12-2, and a longitudinal axis 100. A plurality of inflation gas exit apertures 42 are formed along body 12 to enable fluid communication between an interior of the gas generating system body and associated inflatable element of the vehicle occupant protection system (for example, an airbag.) Gas generating system body 12 may be cast, extruded, or otherwise metal-formed. Apertures 42 may be formed along the gas generating system body by punching, piercing, or other methods known in the art.

Endcaps 24 and 28 are secured at opposite ends of gas generating system body 12 using one or more known methods, to close the ends of the body. In FIG. 1, ends 12-1 and 12-2 of body 12 are crimped over portions of first and second caps 24, 28 to secure the caps within the gas generating system body. Endcaps 24 and 28 may be cast, stamped, or otherwise metal-formed. Alternatively, endcaps 24 and 28 may be molded from a suitable high-temperature resistant polymer.

A filter or buffer 52 is incorporated into the gas generating system design for filtering particulates from gases generated by combustion of a gas generant 16 (described in greater detail below). The filter also acts as a heat sink to reduce the temperature of the hot inflation gas. In addition, filter 52 also encloses gas generant 16 to define a combustion chamber 14 for the gas generant. Filter 52 forms, in conjunction with housing 12, an annular passage or plenum 26 through which combustion gases propagate to discharge apertures 42 from filter 52. As such, passage 26 is designed to further cool the combustion products and to reduce or eliminate flaming of the combustion products prior to the combustion products exiting the gas generating system through apertures 42. Filter 52 may be positioned and secured concentrically within housing 12, preferably centered about housing longitudinal axis 100.

Filter 52 has a first plurality of opposed edge portions 95a, 95b and a second plurality of opposed edge portions 99a, 99b. Filter 52 defines a resiliently expandable enclosure 14 which serves as a combustion chamber. Thus, filter 52 has an effective spring constant such that expansion of the filter produces a force which resists the expansion and which also tends to contract the filter when the expansive force is removed or reduced. The force producing expansion of filter 52 is provided by an increase in the filter internal pressure caused by combustion of gas generant 16. Filter 52 is positioned, suspended or secured within housing 12 such that resilient expansion and contraction of the filter, in the manner described herein, is not substantially impeded. In a particular embodiment, opposite end portions 96 and 97 of the filter abut portions of endcaps 24 and 28, respectively, in a sliding fit, and filter 52 is otherwise unsecured within housing 12. This construction substantially maintains a seal between the end portions of the filter and endcaps 24 and 28, while permitting the body of the filter to expand in response to increased pressure within the filter.

The method of fabricating filter 52 is generally dependent upon the structure of the filter material to be used. In one embodiment, the filter is formed from one or more layers of a compressed knitted metal wire or mesh, commercially available from vendors such as Metex Corp. of Edison, N.J. The layer(s) are rolled as shown in FIGS. 2 and 3. The filter is structured such that, when rolled as shown in FIGS. 2 and 3, flow of gases through the portion of the filter indicated by arrow A is impeded relative to the remaining portion of the filter, due to the increased effective thickness of the filter resulting from the overlapping edge portions of the filter. In this embodiment, resilience may be imparted to the rolled filter structure by at least partially enclosing the filter within one or more spring members or brackets 98 designed to permit resilient expansion and contraction of the filter in response to internal pressure fluctuations. Spring members 98 may be formed from a metal, metal alloy, or a polymer material. It is preferable that the configuration of the spring member and the material from which the spring member is formed combine to minimize the mass of the spring member. This reduces the static and dynamic inertia of the spring member during expansion of the filter, thereby enhancing the responsiveness of the pressure regulation mechanism described herein.

Referring to FIGS. 3 and 4, if desired, layers of a material 90 having a relatively low friction coefficient with respect to the filter material may be applied to edge portions 99a, 99b of the filter to facilitate sliding of the edge portions along the remainder of the filter (and also with respect to other portions of the gas generating system with which other edge portions 99a and 99b are in contact.) In addition, layers of a material 91 having a relatively low friction coefficient relative to endcaps 24 and 28 may also be secured to edge portions 95a and 95b to facilitate sliding of the edge portions with respect to portions of the gas generating system with which other edge portions 95a, 95b are in contact, during filter expansion and contraction. This helps prevent undesirable retardation of filter expansion and contraction. Other mechanisms for reducing sliding friction between the surfaces of the filter may also (or alternatively) be employed.

Figure 4A:
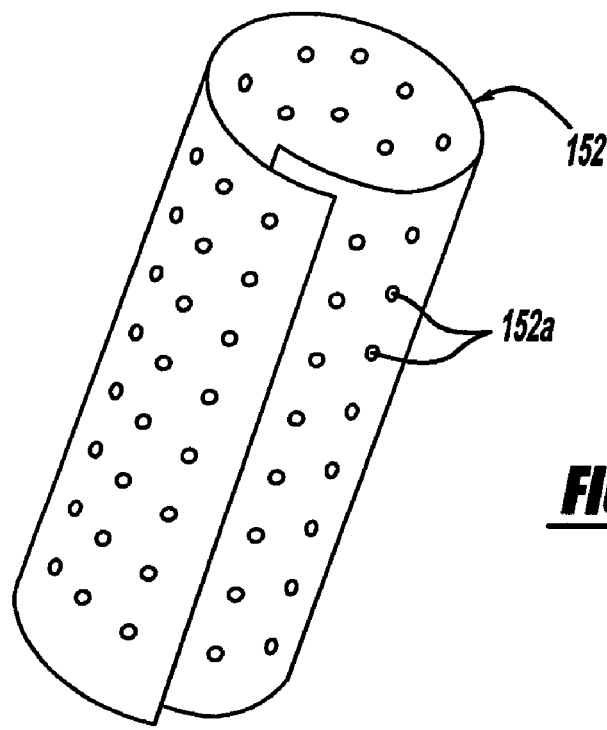
FIG. 4A is a perspective view of a filter in accordance with another embodiment of the present invention.

Referring to FIG. 4A, in another embodiment 152 the filter is formed from a sheet material, preferably a metal or metal alloy, with gas release apertures 152a pierced, punched, or otherwise formed therethrough. In this embodiment, the material is rolled so as to impart residual stresses which tend to maintain the sheet in the formed condition. The sheet can then resiliently unroll in response to an increase in pressure within filter 152.

Other suitable materials may also be employed in fabricating the filter.

A quantity of a propellant or gas generant composition 16 is positioned in combustion chamber 14. Any suitable propellant might be used and exemplary compounds are disclosed in U.S. Pat. Nos. 5,872,329, 6,074,502, and 6,210,505, incorporated herein by reference. The compositions described in these patents exemplify, but do not limit, gas generant compositions useful in the application described herein. Gas generant 16 should be in a form such that any desired spatial arrangement or distribution of the gas generant is positionable and securable within the interior of filter 52.

Referring again to FIG. 1, end cap 24 supports an igniter 62 operably associated with combustion chamber 14 such that upon receipt of a signal generated in a known manner, gas generant composition 16 is ignited in a conventional manner. Depending on spatial and manufacturing requirements, the position and orientation of igniter 62 might be varied without departing from the scope of the present invention. For example, igniter 62 need not be positioned within body 12. One example of an igniter suitable for the application described herein is disclosed in U.S. Pat. No. 6,009,809, incorporated herein by reference. Other igniters mountable so as to be in operable communication with chamber 14 may also be used.

In operation, the pressure regulation mechanism incorporated in gas generating system 10 is designed to maintain the gas generating system internal pressure within a specified range determined to be an optimum pressure range for combustion of gas generant 16. It is desirable to maintain the internal gas generating system pressure within this pressure range for the majority of the combustion process.

Prior to activation of the gas generating system 10, filter 52 rests in an initial state having an internal volume V, as shown in FIG. 3. In operation, when deployment of the vehicle inflatable restraint system is desired, an activation signal is sent to igniter 62 operably associated with combustion chamber 14 of the gas generating system. Gas generant 16 is consequently ignited, directly or via a booster propellant such as is known in the art. Ignition of the gas generant 16 causes a rapid production of hot inflation gases in the combustion chamber defined by filter 52, and therefore a corresponding increase in gaseous pressure. The increase in pressure within filter 52 causes the filter to expand to an internal volume of V+ΔV, as shown in FIG. 4.

The gas exit aperture configurations of filter 52 and housing 12 are specified such that at least a minimum predetermined flow rate of inflation gas is permitted to flow out of housing 12, in order to properly inflate an airbag or other associated inflatable device. Suitable aperture configurations for any given application may be determined in accordance with design requirements of a particular system. As seen from FIGS. 3 and 4, expansion of filter 52 increases the internal volume of the filter, thereby reducing the internal pressure and cooling the gases contained therein. In addition, expansion of the filter increases the filter surface area available for receiving heat transfer from the gases, and also increases the surface area of the filter through which the generated gases can flow because the effective thickness of the filter in the previously-overlapped region is reduced, thereby enabling an increase in the flow rate of gases through this portion of the filter. FIG. 4 shows the additional filter flow area B available upon expansion.

As stated previously, it is desirable that the gas generating system internal pressure during gas generant combustion be maintained within a specified range. Thus, the effective spring constant of filter 52 is preferably specified such that the filter is resiliently expandable to the internal volume of V+ΔV and maintainable in the expanded state by a filter internal pressure within the specified pressure range. The factors set forth above are balanced by the appropriate selection of values for system design parameters, based on experimentation, to provide a system which achieves an equilibrium combustion pressure residing within the desired range during much of the propellant combustion reaction.

In cases where it is desirable to avoid internal pressures outside the specified range and below the low end of the range, the effective spring constant of filter 52 may be specified such that the filter is expandable an initial amount from its rest state to a new state, and maintainable in the new state by a filter internal pressure residing between a median of the specified or design pressure range and an upper limit of the specified pressure range.

Inflation gas exiting filter 52 flows into annular passage 26 (FIG. 1), exiting the gas generating system through apertures 42. Preferably, inflation gas exit apertures 42 formed along body 12 are optimized so as to release gases at substantially the same rate that the gases flow out of filter 52 and into passage 26, to aid in preventing pressure differentials between the interior and exterior of the filter. Such pressure differentials may interfere with the desired responsive filter expansion and/or may produce a filter internal pressure outside the desired pressure range.

It will further be appreciated that design considerations such as the chemical composition, geometry, and spatial arrangement of the propellant, the spring forces controlling the resilient expansion of the filter, and the porosity or gas exit aperture configuration of the filter and housing may be iteratively harmonized to provide in a desired average pressure within the filter 52 during gas generant combustion. As such, when properly informed with the data typically developed in gas generant manufacture, such as the pressure and temperature characteristics required for an optimized combustion of the propellant, other design criteria such as the number and size of gas exit orifices in the housing 12, the gas flow exit aperture configuration of the filter, and the spring force required to provide responsive resilient expansion of the filter may be appropriately and iteratively selected to provide a combustion chamber within filter 52 that essentially maintains an optimized average pressure during combustion of the propellant. In sum, the spring forces and the gas exit aperture configurations may be either singularly or jointly evaluated on a trial and error basis depending on the propellant composition and selected filter material, and further depending on other design variables as known in the art.

Gas generating system housings having configurations other than the cylindrical shape shown herein may be used, provided they are suitable for incorporating an embodiment of the pressure regulation mechanism described herein.

Accordingly, the present invention maintains the gas generating system combustion pressure within an optimum range during the majority of the combustion event by automatically and continually controlling the internal pressure of the combustion chamber. The pressure regulation mechanism disclosed herein greatly improves the ballistic performance of the gas generating system, while minimizing the generation of undesirable effluents due to low-pressure combustion.

Figure 5:
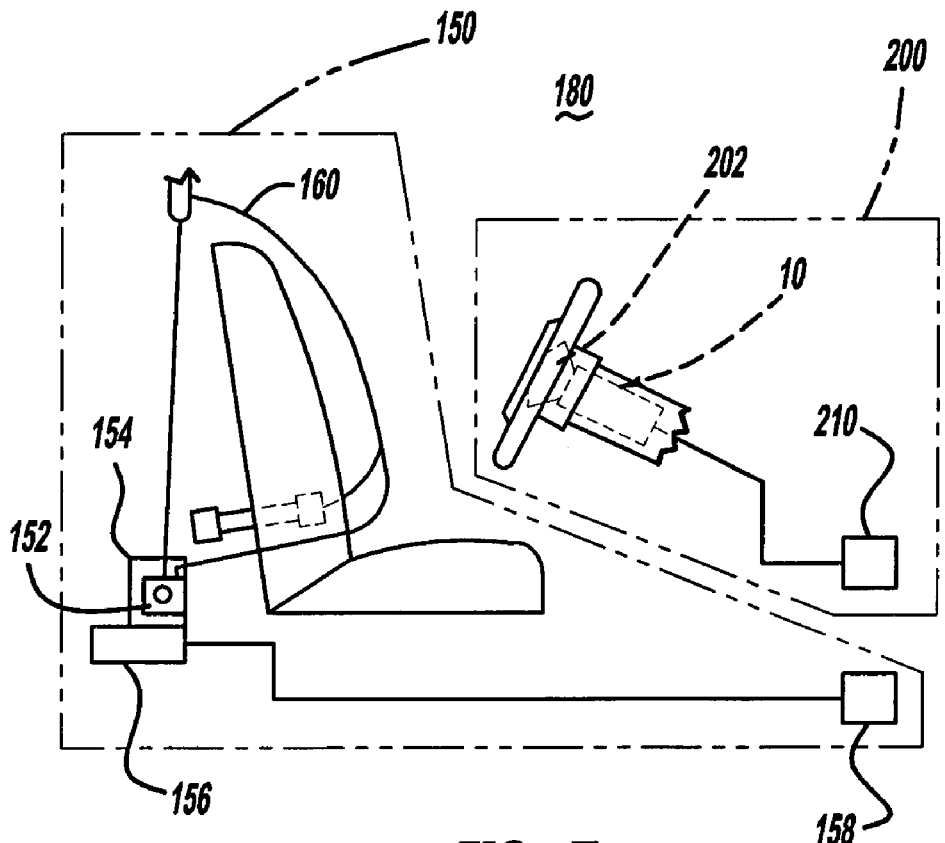
FIG. 5 is a schematic representation of an exemplary vehicle occupant protection system incorporating a gas generating system in accordance with the present invention.

Referring to FIG. 5, a gas generating system or inflator 10 as described above is incorporated into an airbag system 200. Airbag system 200 includes at least one airbag 202 and a gas generating system 10 as described herein coupled to the airbag so as to enable fluid communication with an interior of the airbag upon activation of the gas generating system. Airbag system 200 may also be in communication with a known crash event sensor 210 that is in operative communication with a crash sensor algorithm (not shown) which signals actuation of airbag system 200 via, for example, activation of igniter 62 (not shown in FIG. 5) in the event of a collision.

Referring again to FIG. 5, an embodiment of the gas generating system or an airbag system including an gas generating system of the present invention may be incorporated into a broader, more comprehensive vehicle occupant protection system 180 including additional elements such as a safety belt assembly. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical seat belt retractor mechanisms which may be used in conjunction with safety belt 100 are described in U.S. Pat. Nos. 5,743,480, 5,553,803, 5,667,161, 5,451,008, 4,558,832 and 4,597,546, incorporated herein by reference. Illustrative examples of typical pretensioners with which safety belt 160 may be combined are described in U.S. Pat. Nos. 6,505,790 and 6,419,177, incorporated herein by reference.

Exemplifying yet another gas generating system containing a gas generating system of the present invention, safety belt assembly 150 may be in communication with a known crash event sensor 158 (for example, an inertia sensor or an accelerometer) that is in operative communication with a known crash sensor algorithm (not shown) which signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A filter defining an enclosure having a volume that is resiliently variable responsive to an internal pressure within the enclosure, wherein the filter includes at least one sheet of filter material and at least one spring member operatively coupled to the filter material so as to exert a force on the filter material that is substantially proportional to the pressure within the enclosure, wherein the filter material is rolled to form a substantially cylindrical enclosure, and wherein the at least one spring member is wrapped around at least a portion of the rolled filter material.

2. The filter of claim 1 wherein a gas generant material is positioned in the enclosure, and wherein the volume of the enclosure is resiliently variable responsive to pressure exerted by combustion products resulting from combustion of the gas generant material within the enclosure.

3. A gas generating system comprising:
a housing; and
a filter in accordance with claim 1 positioned within the housing.

4. The gas generating system of claim 3 wherein the filter is secured along a central axis of the housing.

5. The gas generating system of claim 3 wherein the filter is spaced apart from the housing to define a fluid flow passage extending between the housing and the filter.

6. A vehicle occupant protection system comprising:
an airbag system having at least one airbag and an inflator coupled to the airbag so as to enable fluid communication with an interior of the airbag upon activation of the inflator, the inflator including a filter in accordance with claim 1.

7. A gas generating system comprising a filter in accordance with claim 1.

8. A vehicle occupant protection system comprising a filter in accordance with claim 1.

9. A filter defining an enclosure having a volume that is resiliently variable responsive to an internal pressure within the enclosure, wherein the filter includes at least one sheet of filter material having opposed edge portions, and wherein a material having a low friction coefficient relative to the filter material is applied to at least one of the edge portions to facilitate sliding of the at least one edge portion along the filter material.

10. A gas generating system comprising a filter in accordance with claim 9.

11. A vehicle occupant protection system comprising a filter in accordance with claim 9.

12. A filter defining an enclosure having a volume that is resiliently expandable responsive to an enclosure internal pressure produced by a combustion reaction in a gas generant material, so as to maintain the internal pressure within a predetermined pressure range during a majority of the combustion reaction, wherein resilient expendability of the enclosure volume is facilitated by providing a spring member enclosing a portion of the filter.

13. The filter of claim 12 further comprising a sheet material with gas release apertures formed therethrough, the sheet material being formed to a shape defining the enclosure, the sheet material being formed so as to impart residual stresses thereto which tend to maintain the sheet material in the formed condition.

14. The filter of claim 12 wherein the volume of the enclosure is maintainable at a value within a predetermined range including the predetermined value, responsive to an enclosure internal pressure within the predetermined pressure range.

15. A gas generating system comprising a filter in accordance with claim 12.

16. A vehicle occupant protection system comprising a filter in accordance with claim 12.

17. A gas generating system comprising:
a housing; and
a filter positioned within the housing, the filter defining an enclosure having a volume that is resiliently variable responsive to an internal pressure within the enclosure, wherein the filter includes at least one sheet of filter material having an edge portion abutting another portion of the gas generating system, and wherein a material having a low friction coefficient relative to the abutting portion of the gas generating system is applied to the edge portion of the filter to facilitate sliding of the filter edge portion with respect to the abutting portion of the gas generating system.

18. A method of controlling combustion within a gas generating system comprising the steps of:
providing a filter for filtering combustion products within the gas generating system, the filter defining a combustion chamber having a volume;
providing a gas generant composition within the filter for production of gases upon combustion thereof; and
resiliently varying a pressure acting on an exterior of the chamber responsive to an internal pressure within the chamber to maintain the internal pressure within a predetermined pressure range upon combustion of the gas generant composition, wherein the step of resiliently varying a pressure acting on an exterior of the chamber is facilitated by providing a spring member enclosing a portion of the filter.

* * * * *